(12) United States Patent
Jankovich et al.

(10) Patent No.: US 8,473,257 B2
(45) Date of Patent: Jun. 25, 2013

(54) SYSTEM AND METHOD FOR CONSTRAINING CURVES IN A CAD SYSTEM

(75) Inventors: Steven Robert Jankovich, Buena Park, CA (US); Dong Ping Zhang, Shanghai (CN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 543 days.

(21) Appl. No.: 12/732,699

(22) Filed: Mar. 26, 2010

(65) Prior Publication Data

US 2011/0238385 A1    Sep. 29, 2011

(51) Int. Cl.
*G06F 17/50* (2006.01)

(52) U.S. Cl.
USPC .............................. 703/1; 345/442

(58) Field of Classification Search
USPC ............... 703/1; 345/419, 420, 441, 442, 443
See application file for complete search history.

(56) References Cited

U.S. PATENT DOCUMENTS

| | | | |
|---|---|---|---|
| 6,897,862 B2 | 5/2005 | Jiang et al. | |
| 7,814,441 B2 | 10/2010 | Bae et al. | |
| 2004/0085311 A1* | 5/2004 | Lee et al. | 345/419 |
| 2004/0174362 A1* | 9/2004 | Celniker | 345/441 |
| 2006/0082572 A1* | 4/2006 | Baardse et al. | 345/419 |
| 2009/0237410 A1 | 9/2009 | Baardse et al. | |

OTHER PUBLICATIONS

PCT International Search Report dated Jul. 11, 2011 corresponding to PCT Application No. PCT/US2011/029907 filed Mar. 25, 2011 (19 pages).
Sutherland, Sketchpad—A Man-Machine Graphical Communication System; Proceedings of the Spring Joint Computer Conference. Mass.; 1963, pp. 329-346 (18 pages).
SOHRT, Interaction with Constraints in 3D Modeling, pp. 387-396, Dept. of Computer Science, Univ. of Utah, XP002231158; 1991; (10 pages).
Anonymous; Nemetschedk Allplan GmbH, Munich, DE; XP55001364, pp. 1-151, last paragraph, p. 47; Others; 2009 (159 pages).
Anonymous; Nemetschek Allplan GmbH, Munich, Germany; XP55001366, pp. 95-96; Others; 2008 (4 pages).

* cited by examiner

*Primary Examiner* — Kamini S Shah
*Assistant Examiner* — Luke Osborne

(57) ABSTRACT

A CAD system, method, and computer readable medium. A method includes receiving a graphic model and a selection of a symmetric constraint. The method includes receiving a selection of first and second curves of the graphic model, the selections indicating respective points on the first and second curves. The method includes determining a user's intent and applying a symmetric constraint between the first and second curves according to the user's intent. The method includes storing and displaying graphic model.

21 Claims, 3 Drawing Sheets

SYSTEM AND METHOD FOR CONSTRAINING CURVES IN A CAD SYSTEM

TECHNICAL FIELD

The present disclosure is directed, in general, to systems and methods for use in computer-aided design, manufacturing, engineering, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customer, and other users to manage the design, use, and disposal of various products. Improved systems are desirable.

SUMMARY OF THE DISCLOSURE

Various embodiments include a CAD system, method, and computer readable medium. A method includes receiving a graphic model and a selection of a symmetric constraint. The method includes receiving a selection of first and second curves of the graphic model, the selections indicating respective points on the first and second curves. The method includes determining a user's intent and applying a symmetric constraint between the first and second curves according to the user's intent. The method includes storing and displaying graphic model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
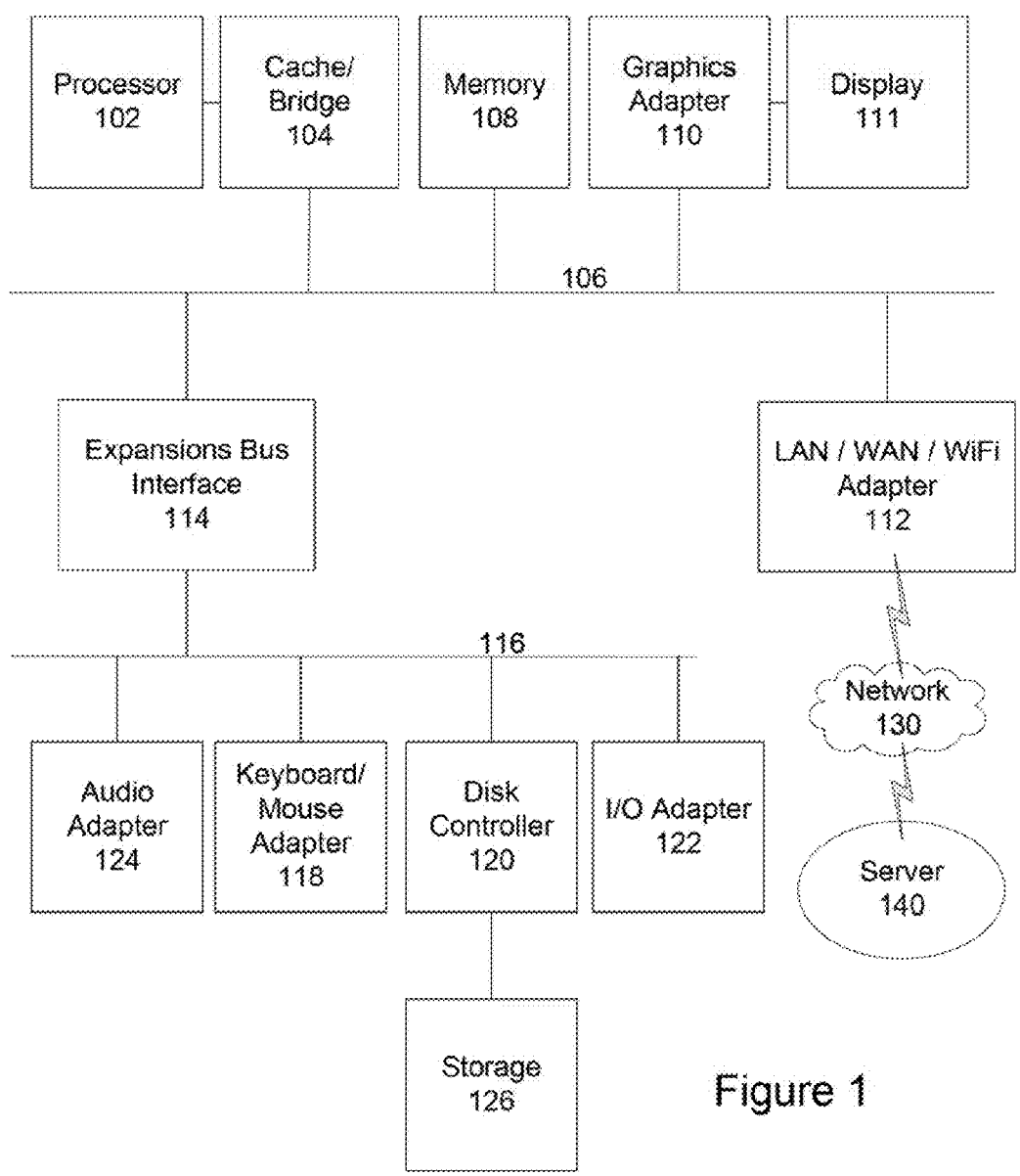
FIG. 1 depicts a block diagram of a data processing system in which an embodiment can be implemented in accordance with disclosed embodiments.
Figure 2A:
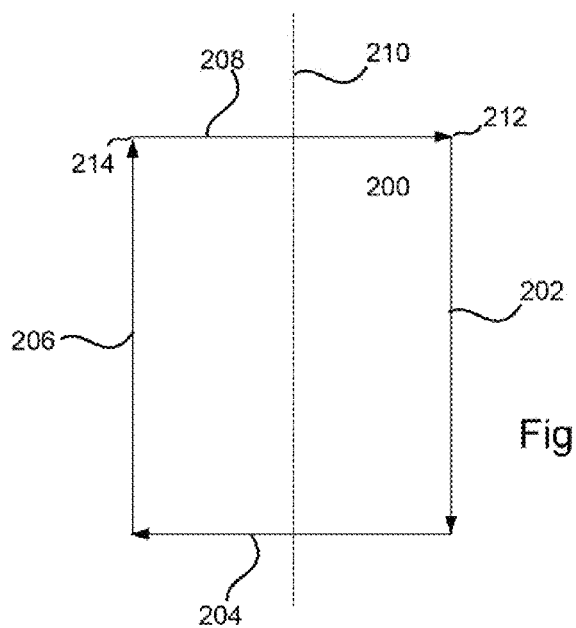
FIGS. 2A and 2B depict two simple examples to illustrate typical cases in accordance with disclosed embodiments.
Figure 2B:
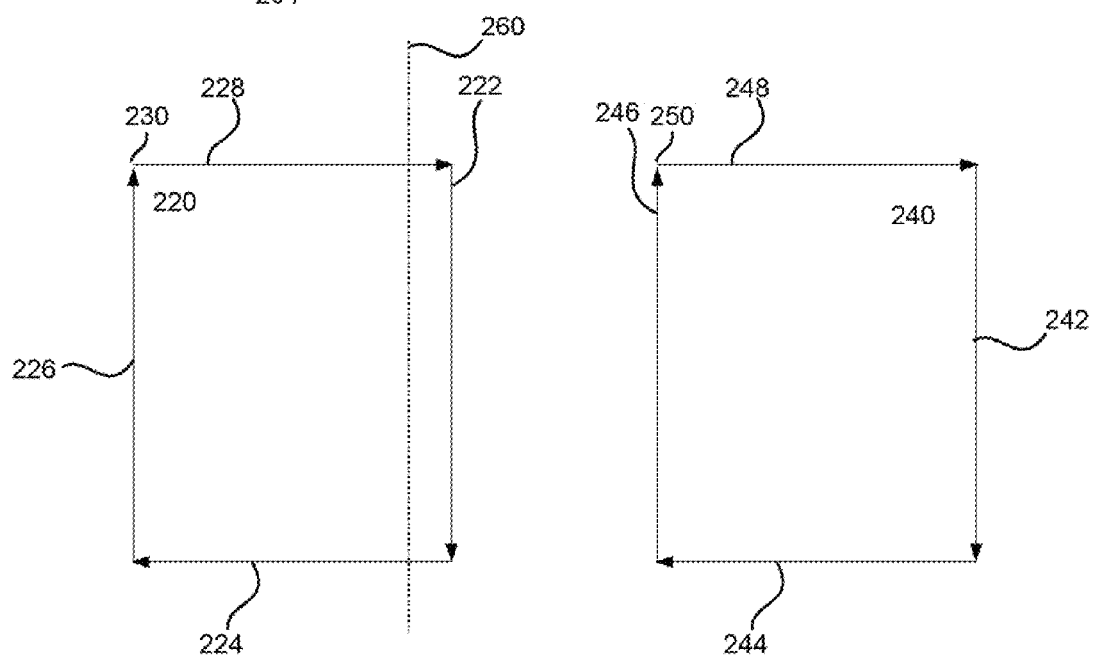
Figure 3:
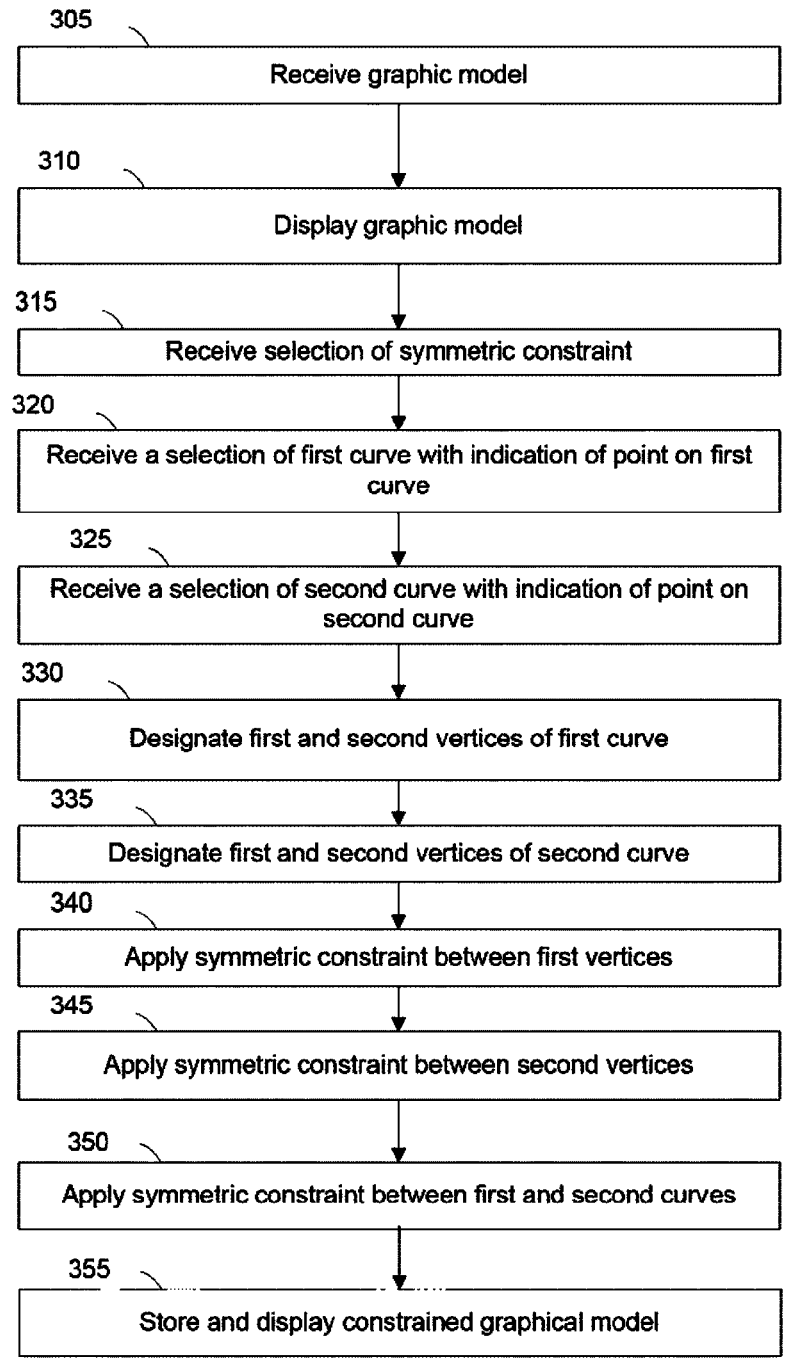
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

When manipulating a model in a CAD system or PLM system, a user often desires to make two curves symmetric to each other where the curves have constraints to other geometry. Disclosed embodiments provide user control over whether the curves are aligned or anti-aligned, preventing them from collapsing to zero length, the typical behavior in known systems.

Each curve is typically maintained in a CAD system as having a start point (vertex) and an end point. As used herein, "aligned" indicates that the curves run in the same direction (when considered as a vector from start to end), and are aligned with the start points generally adjacent or corresponding to each other ("start-to-start"), and the end points are also generally adjacent or corresponding to each other ("end-to-end"). In a solid model, aligned faces would be facing the same direction.

"Anti-aligned" indicates the opposite, that the curves run in opposite directions ("start-to-end"). In a solid model, anti-aligned faces generally face each other.

Some CAD tools include a command, such as a "Mirror" command, that can attempt to mirror existing points and curves by creating a copy and applying a geometric constraint between the original geometry and the copy. In some cases, a user may wish to apply a similar symmetric constraint to existing geometry, by making existing curves or points symmetric about a centerline.

Using other tools, this process fails since the selected curves frequently collapse to zero length, for example from the presence of other constraints on each curve. Conventional systems cannot automatically determine whether two existing curves should be aligned or anti-aligned.

The disclosed embodiments provide a system and method that modify a geometric model to correctly apply a symmetric constraint. Various embodiments interpret a user input to determine user intent, then determine whether the selected curves should be processed as aligned or anti-aligned to produce the correct solution.

FIG. 1 depicts a block diagram of a data processing system in which an embodiment can be implemented, for example as a CAD system. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIGS. 2A and 2B depict two simple examples to illustrate typical cases.

First, a rectangle model in a CAD system is typically made up of four lines connected start to end in a loop, as shown in rectangle 200 of FIG. 2A. Rectangle 200 is made up of lines 202, 204, 206, and 208 (shown as arrows for illustrative purposes), connected start-to-end in a loop. In this case, the "end" vertex is represented by the "head" of the arrow, and the "start" vertex is represented as the "tail" line of the arrow. If two opposite lines 202 and 206 of the rectangle are made symmetric, then they must be aligned start to end to get a useful result. That is, start point 212 of line 202 is constrained against end point 214 of line 206.

A common solution would be to make the start points of lines 202 and 206 symmetric to each other; a mathematical solution that collapses both lines to zero length and the rectangle becomes a single line as the connected points move with the collapsed lines, in a clear failure case. The curves typically collapse since each touching curve pair is constrained to be coincident at all four end points and the lines are constrained to remain perpendicular/parallel. The only solution is to drive the curve to zero length. Without these other constraints, the symmetric constraints could be solved by flipping one of the symmetric lines over (either violating the coincident constraints or the perpendicular constraints).

Disclosed embodiments, however, determine that these lines should be processed as anti-aligned, and correctly make them symmetric about center line 210 by constraining start point of 202 symmetric with the end point of 206, and vice versa.

Second, consider two such rectangles placed next to each other, as rectangles 220 and 240 of FIG. 2B. Rectangle 220 is made up of lines 222, 224, 226, and 228 (shown as arrows for illustrative purposes), connected start-to-end in a loop. Rectangle 240 is made up of lines 242, 244, 246, and 248 (shown as arrows for illustrative purposes), connected start-to-end in a loop.

When line 226 from rectangle 220 is made symmetric to the corresponding line 246 of the rectangle 240, the curves align and the constraint must be created start to start and end to end as constrained about center line 260. That is, the end point 230 of line 226 is constrained according to end point 250 of line 246, and the corresponding start points of lines 226 and 246 are used for the other endpoint constraint. Note that this is the opposite of the previous case—the system must perform a start-to-start/end-to-end constraint, which would have failed in the case of FIG. 2A, not a start-to-end constraint, which would fail in the case of FIG. 2B.

If there are other constraints that already connect the two selected lines somehow, the start-to-end solution can also lead to the geometry collapsing to zero length (or some other mangling of the sketch).

Note that, in these examples, the center line is typically determined by the system in accordance with various rules, but may or may not be actually displayed to the user. The center line will typically be determined to be between the two selected lines or curves, but could be placed elsewhere according to any other constraints or rules determined by the system.

Beyond these simple examples, the general solution is hard to determine. It is not practical to evaluate what constraints exist between two selected curves in the general case. The network of wireframe geometry and constraints needs to be solved completely before the result can be generally determined.

Disclosed embodiments address this issue by using the location of the user's object selection as additional information to the user's intent. As curves are selected to apply the symmetric constraint, the two end points nearest the two selection locations are made symmetric to each other by the system. This process allows the user control over how the symmetry constraint is applied by the CAD system.

Processes for adding constraints are well known in the art of CAD systems. A symmetric constraint can be defined by constraining the appropriate pairs of endpoints, then constraining the curves between these endpoints. Adding a symmetric constraint cannot be effectively performed in conventional systems since these systems either add such a constraint in an start-to-start/end-to-end fashion, or in a start-to-end fashion, but have no ability to intelligently and effectively decide between these possibilities.

Various disclosed embodiments determine user intent according to the user's selection, without requiring any additional input from the user such as extra keypresses, mouse clicks, or other input over the selection of the curves. In particular, the system can determine which vertexes should be aligned based on where on each line (or other element of the graphical model) the user makes the selection.

In some embodiments, the system uses the vertex that is nearest to where the user made the selection of each line as the vertices to be constrained in relation to each other. In the context of FIG. 2B, when the system receives the user's selection of line 226, typically by a mouse pointer/click, pen input, or input based on the displayed model itself (generically described as "clicking on" for simplicity), the system determines where on line 226 the user has made the selection. The system then determines which vertex of the relevant curve is closer to the point at which the user made the selection of the line. If the user selects line 226 by clicking on any point in the upper half of line 226, the system determines that end point 230 is the closest vertex, and selects end point 230 as the vertex to be constrained. If the user selects line 226 by clicking on any point in the lower half of line 226, the system determines that the start point (opposite end point 230) is the closest vertex, and selects this start point as the vertex to be constrained.

The system makes a similar determination according to the second line selected by the user, and where on that line the user has clicked, and so determines the second vertex for the constraint. These vertices are constrained against each other, then the system can constrain the opposite vertices of each curve against each other, and finally the curves themselves can be constrained against each other based on the endpoint constraints. The resulting model is displayed to the user and stored in the system.

FIG. 3 depicts a flowchart of a process in accordance with disclosed embodiments. Note that various steps described herein may be performed concurrently or in a different order. For example, the selection of a symmetric constraint in step 315 below may occur before or after the selection of one or more of the curves.

The CAD system receives a graphic model (step 305). "Receiving," as used herein, can include loading or retrieving from storage, receiving from another system, receiving or developing by an interaction with a user, or otherwise, including a combination of these. The graphic model has a plurality of curves, and each curve has two endpoint vertices.

The CAD system displays the graphic model to the user (step 310).

The CAD system receives a user selection of a symmetric constraint (step 315). In some embodiments, this step can include receiving a user selection of a center line about which the other curves should be made symmetric. In other embodiments, the center line can be determined automatically by the CAD system, as described below.

The CAD system receives a user selection of a first curve of the graphic model by a user indication of a point on the first curve (step 320).

The CAD system receives a user selection of a second curve of the graphic model by a user indication of a point on the second curve (step 325)

The CAD system designates the endpoint vertex of the first curve that is nearest to the indicated point on the first curve as a first vertex of the first curve and designates the opposite endpoint of the first curve as a second vertex of the first curve (step 330).

The CAD system designates the endpoint vertex of the second curve that is nearest to the indicated point on the second curve as a first vertex of the second curve and designates the opposite endpoint of the second curve as a second vertex of the second curve (step 335).

Of course, the labels "first vertex" and "second vertex" are arbitrary labels used for the purpose of explanation. The CAD system may designate these in any other way sufficient to indicate which vertices should be constrained against each other. Steps 330-335 enable the CAD system to determine the user's intent for the symmetric constraint. In this way, the first and second vertices can be designated without reliance on start points and end points for the curve, which can lead to incorrect results.

The CAD system applies a symmetric constraint between the first vertex of the first curve and the first vertex of the second curve (step 340). As a part of this step, in some embodiments, the CAD system can determine a center line between the first curve and the second curve and apply the symmetric constraint between the first vertex of the first curve and the first vertex of the second curve with relation to the center line.

The CAD system applies a symmetric constraint between the second vertex of the first curve and the second vertex of the second curve (step 345). As a part of this step, the CAD system can apply the symmetric constraint between the second vertex of the first curve and the second vertex of the second curve with relation to the center line.

The CAD system applies a symmetric constraint between the first curve and the second curve (step 350). As a part of this step, the CAD system can apply the symmetric constraint between the first curve and the second curve with relation to the center line. Steps 340-350 enable the system to apply the symmetric constraint to the curves according to the user's intent.

The CAD system then stores and displays the graphical model after the constraints are applied (step 355).

In some embodiments, the light-weight interaction model of the dialog is modified so that the user can select the curves, identify which ends of the two curves should align, perhaps view a preview, make any adjustments, and then press OK/Apply.

In some embodiments, the system only allows the user interface dialog to "snap" to end points of the curves, so that the start or end point is selected itself, instead of just being "close to" it. A setting is provided in the user interface dialog to indicate that the whole curve should be made symmetric. The system can then use the indicated snap points as the ends to align.

Some embodiments provide additional dialog tools to provide a different solution to the user, such as a "cycle solutions" function, a "flip direction" function, and others.

Some embodiments provide a realtime dynamic preview before or as the curve is selected to display the way the curves would be aligned according to the selection and the processes described herein.

Other ways of solving the problem without gathering the input from the user are not successful. Embodiments disclosed herein are not limited to techniques to prevent collapsing upon application of a symmetric constraint. For completely independent curves, the method of determining user intent can cause curves that are near-symmetric already to be made symmetric using the more extreme solution. The techniques described herein can enable a system to determine user intent to flip a line over, reversing its direction, for example. Simply finding the "simplest" solution will not allow for this behavior.

Ultimately, it is impossible to for a system correctly guess which way the user wants to apply the symmetry constraint to the selected curves. Even if two curves are already symmetric with respect to a center line, the user may want the other solution, where one curve would need to rotate 180 degrees. No known heuristics will solve the problem without input from the user.

However, the disclosed embodiments require no extra gesture from the user to communicate the intent. Simply by selecting the geometry appropriately, the processes described herein apply the symmetry constraint as intended consistently and reliably all of the time.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for constraining a graphical model in a computer-aided design (CAD) system, comprising:
   receiving a graphic model in a CAD system;
   receiving a selection of a symmetric constraint by the CAD system;
   receiving a selection of a first curve of the graphic model by the CAD system, the selection indicating a first point at a location on the first curve;
   receiving a selection of a second curve of the graphic model by the CAD system, the selection indicating a second point at a location on the second curve;
   determining a user's intent by the CAD system based on the locations of the first point and the second point, including designating at least one vertex of the first curve according to the location of the first point and designating at least one vertex of the second curve according to the location of the second point;
   applying a symmetric constraint between the first and second curves, by the CAD system, according to the user's intent and the designated vertices; and
   storing and displaying graphic model by the CAD system.

2. The method of claim 1, wherein determining the user's intent includes designating an endpoint of the first curve that is nearest to the indicated point on the first curve as a first vertex of the first curve, and designating an endpoint of the second curve that is nearest to the indicated point on the second curve as a first vertex of the second curve.

3. The method of claim 2, wherein applying a symmetric constraint between the first and second curves includes applying a symmetric constraint between the first vertex of the first curve and the first vertex of the second curve.

4. The method of claim 1, wherein determining the user's intent includes designating an endpoint of the first curve that is furthest to the indicated point on the first curve as a second vertex of the first curve, and designating an endpoint of the second curve that is furthest to the indicated point on the second curve as a second vertex of the second curve.

5. The method of claim 4, wherein applying a symmetric constraint between the first and second curves includes applying a symmetric constraint between the second vertex of the first curve and the second vertex of the second curve.

6. The method of claim 1, wherein determining the user's intent includes determining that an endpoint of the first curve nearest to the indicated point on the first curve should be symmetric to an endpoint of the second curve nearest to the indicated point on the second curve.

7. The method of claim 1, wherein applying a symmetric constraint between the first and second curves includes determining a center line between the first and second curves.

8. A computer-aided design (CAD) system comprising a processor and accessible memory, the CAD system particularly configured to perform the steps of:
   receiving a graphic model;
   receiving a selection of a symmetric constraint;
   receiving a selection of a first curve of the graphic model, the selection indicating a first point at a location on the first curve;
   receiving a selection of a second curve of the graphic model, the selection indicating a second point at a location on the second curve;
   determining a user's intent based on the locations of the first point and the second point, including designating at least one vertex of the first curve according to the location of the first point and designating at least one vertex of the second curve according to the location of the second point;
   applying a symmetric constraint between the first and second curves, according to the user's intent and the designated vertices; and
   storing and displaying graphic model.

9. The CAD system of claim 8, wherein determining the user's intent includes designating an endpoint of the first curve that is nearest to the indicated point on the first curve as a first vertex of the first curve, and designating an endpoint of the second curve that is nearest to the indicated point on the second curve as a first vertex of the second curve.

10. The CAD system of claim 9, wherein applying a symmetric constraint between the first and second curves includes applying a symmetric constraint between the first vertex of the first curve and the first vertex of the second curve.

11. The CAD system of claim 8, wherein determining the user's intent includes designating an endpoint of the first curve that is furthest to the indicated point on the first curve as a second vertex of the first curve, and designating an endpoint of the second curve that is furthest to the indicated point on the second curve as a second vertex of the second curve.

12. The CAD system of claim 11, wherein applying a symmetric constraint between the first and second curves includes applying a symmetric constraint between the second vertex of the first curve and the second vertex of the second curve.

13. The CAD system of claim 8, wherein determining the user's intent includes determining that an endpoint of the first curve nearest to the indicated point on the first curve should be symmetric to an endpoint of the second curve nearest to the indicated point on the second curve.

14. The CAD system of claim 8, wherein applying a symmetric constraint between the first and second curves includes determining a center line between the first and second curves.

15. A non-transitory computer-readable storage medium encoded with computer-executable instructions that, when executed, cause a computer-aided design (CAD) data processing system to perform the steps of:
receiving a graphic model;
receiving a selection of a symmetric constraint;
receiving a selection of a first curve of the graphic model, the selection indicating a first point at a location on the first curve;
receiving a selection of a second curve of the graphic model, the selection indicating a second point at a location on the second curve;
determining a user's intent based on the locations of the first point and the second point, including designating at least one vertex of the first curve according to the location of the first point and designating at least one vertex of the second curve according to the location of the second point;
applying a symmetric constraint between the first and second curves, according to the user's intent and the designated vertices; and
storing and displaying graphic model.

16. The computer-readable storage medium of claim 15, wherein determining the user's intent includes designating an endpoint of the first curve that is nearest to the indicated point on the first curve as a first vertex of the first curve, and designating an endpoint of the second curve that is nearest to the indicated point on the second curve as a first vertex of the second curve.

17. The computer-readable storage medium of claim 16, wherein applying a symmetric constraint between the first and second curves includes applying a symmetric constraint between the first vertex of the first curve and the first vertex of the second curve.

18. The computer-readable storage medium of claim 15, wherein determining the user's intent includes designating an endpoint of the first curve that is furthest to the indicated point on the first curve as a second vertex of the first curve, and designating an endpoint of the second curve that is furthest to the indicated point on the second curve as a second vertex of the second curve.

19. The computer-readable storage medium of claim 18, wherein applying a symmetric constraint between the first and second curves includes applying a symmetric constraint between the second vertex of the first curve and the second vertex of the second curve.

20. The computer-readable storage medium of claim 15, wherein determining the user's intent includes determining that an endpoint of the first curve nearest to the indicated point on the first curve should be symmetric to an endpoint of the second curve nearest to the indicated point on the second curve.

21. The computer-readable storage medium of claim 15, wherein applying a symmetric constraint between the first and second curves includes determining a center line between the first and second curves.

* * * * *